United States Patent [19]
Ottmann et al.
[11] 3,732,168
[45] May 8, 1973

[54] PROCESS AND COMPOSITION FOR THE PRODUCTION OF INSULATING SOLDERABLE COATINGS

[75] Inventors: Gerhard F. Ottmann; Hans-Ulrich Poth, both of Wuppertal-Elberfeld, Germany; Horst Holfort, Mexico 20 DF, Mexico

[73] Assignee: Dr. Kurt Herberts & Co. vorm Otto Louis Herberts, Wuppertal-Barmen, Germany

[22] Filed: Nov. 9, 1970

[21] Appl. No.: 88,183

[30] Foreign Application Priority Data

Nov. 13, 1969 Germany....................P 19 57 157.4

[52] U.S. Cl. ......................252/63.7, 117/6, 117/128, 117/128.4, 117/231, 117/232, 174/110 SR

[51] Int. Cl. ............................B44d 1/42, H01b 3/18

[58] Field of Search.......................117/6, 128, 128.4, 117/231, 232; 252/63.7; 174/110 SR

[56] References Cited

UNITED STATES PATENTS

| | | | |
|---|---|---|---|
| 3,426,098 | 2/1969 | Meyer et al. | 260/841 |
| 3,523,820 | 8/1970 | Scheffer | 117/218 |
| 3,201,276 | 8/1965 | Meyer et al. | 117/218 |
| 3,487,051 | 12/1969 | Suzuki et al. | 260/78 |
| 3,549,599 | 12/1970 | Merten | 260/77.5 |
| 3,562,217 | 2/1971 | Zalewski et al | 260/63 |

FOREIGN PATENTS OR APPLICATIONS

| | | |
|---|---|---|
| 1,082,181 | 9/1967 | Great Britain |

*Primary Examiner*—Robert F. Burnett
*Assistant Examiner*—Robert A. Dawson
*Attorney*—Oberlin, Maky, Donnelly & Renner

[57] ABSTRACT

A process and composition for producing insulating solderable coatings on electrical conductors are disclosed wherein a solution containing a polyhydroxyl compound having a heterocyclic ring system and from 5 to 12 percent by weight hydroxyl groups, and a polyfunctional isocyanate is coated on the conductor and cured at a temperature above 250° C. The coated conductors are characterized by high resistance to heat and chemicals, as well as short soldering times in a solder bath.

19 Claims, No Drawings

PROCESS AND COMPOSITION FOR THE PRODUCTION OF INSULATING SOLDERABLE COATINGS

This invention relates to a process for the production of insulating solderable coatings on electric conductors, to solutions for carrying out the process and to a process for removing the insulating coatings from the electrical conductors by immersing the insulated electrical conductor in a solder bath heated to elevated temperatures.

It is known that insulating solderable coatings can be produced on electrical conductors. In this particular context, the expression "solderable" means that when the insulated electrical conductors are immersed in a solder bath heated to elevated temperatures the insulation is readily destroyed and detached where the conductor has been immersed in the bath so that the bare metal is exposed at these points and can be directly used for electrically conductive connections. To this end, the insulating coating should be removed as quickly as possible, i.e., in a matter of seconds, following its immersion in the solder bath. The shorter the contact time, the easier it is to remove the insulation and hence to obtain a commercially advantageous procedure. Baths of tin or tin alloys are normally used as the solder bath for this purpose. De-insulation and soldering are carried out in basically the same way in the connection of so-called printed circuits to Lectrical conductors. This particular field is of considerable commercial significance. Hitherto, the insulating solderable coatings have been produced on electrical conductors by coating the conductors with solutions containing (*a*) compounds with at least two hydroxyl groups and (*b*) masked bi- or higher-functional isocyanates, for which purpose components (*a*) and/or (*b*) must be at least partly trifunctional or more highly functional, and the conductors thus coated heated to temperatures above 250° C. An insulating, solderable continuous coating is baked on to the electrical conductors in this way. The disadvantage of these known coatings is that they show very little resistance to heat and chemicals. The reason for this, however, is that, on account of the required property of solderability, the coatings have to be destroyed at relatively low temperatures in the solder bath. Reference is made in this connection to German Pat. Specifications 728,981; 756,058 and to German Auslegeschrifts 1,074,179; 1,067,549 and 1,249,426.

On the other hand, it is known that heat-resistant insulating coatings can be obtained by coating the electrical conductors with solutions of modified polyester resins, and heating the conductors thus coated to elevated temperatures. Polyester resins and polyester imide resins modified by five-membered imide rings have acquired particular commercial significance in this respect (cf. British Pat. Specification 1,082,181; Belgian Pat. Specification 663,429; French Pat. Specification 1,391,834; East German Pat. Specification 30,838; German Offenlegunsschrifts 1,494,542; 1,494,454; 1,494,413 and 1,814,497). It was by no means obvious to the ordinarily skilled artisan to use modified polyesters of the foregoing kind which form heat-resistant coatings for the production of solderable coatings, because it is totally unexpected that these coatings would be capable of being destroyed quickly enough in the solder bath to make it impossible to obtain any commercially useful degree of solderability along the lines of the foregoing observations. If the conventional lacquers currently available on the market for producing heat-resistant coatings are tested in this respect, it is in fact impossible to obtain any useful solderable coatings. However, it has surprisingly been found that, by way of a certain type of modification with compounds containing heterocyclic ring systems in the molecule which are reacted with isocyanates, it is possible to obtain insulating solderable coatings on electrical conductors which, although showing a surprisingly high degree of resistance to heat and chemicals, only require extremely short soldering times in the solder bath. Accordingly, the coatings according to the invention combine basically opposing properties, namely thermal stability under "normal" conditions and, on the other hand, high thermolability in the solder bath.

Accordingly, the present invention relates to a process for the production of insulating solderable coatings on electrical conductors by coating the conductors with solutions containing a. compounds with at least two hydroxyl groups,
b. masked bi- or higher-functional isocyanates, for which purpose the components (*a*) and/or (*b*) have to be at least partly trifunctional or more highly functional, and the usual additives and/or catalysts, and heating the conductors thus coated to temperatures above 250° C, which process is distinguished according to the invention by the fact that the compounds of component (*a*) are compounds containing, in part at least, heterocyclic ring systems in the molecule and 5 to 12 percent by weight of hydroxyl groups.

Metal wires are preferably used as the electrical conductors for the purposes of the invention, as was previously the case. The conductors are coated with the solutions in the apparatus normally used for this purpose. After coating, the coatings are "baked" by heating to elevated temperatures, in other words relatively high molecular weight compounds which give a continuous coating are formed during heating to elevated temperatures, accompanied by cross linking. The solutions can contain additives and/or catalysts of the kind normally used in this field, such as for example organic metal compounds such as butyl titanate, zinc octoate, lead naphthenate, strongly polar relatively highly boiling solvents as levelling agents and the like. The solvents normally used in this field, such as cresols, solvent naphtha, glycol ethers and acetates and the like, are also used as solvents. Reference is made in this connection to the Patent Specifications quoted earlier.

Components (*a*) and/or (*b*) have to be at least partly tri-functional or more highly functional to enable at least three-dimensional crosslinking to take place. This is also known to one of ordinary skill. The ratio between hydroxyl groups and isocyanate groups is best in the range of from about 0.6:1 to 1.3:1, in other words an excess of either hydroxyl groups or isocyanate groups can be present.

The compounds used as component (*a*) in accordance with the invention, containing, at least in part, heterocyclic ring systems in the molecule and from 5 to 12 percent by weight of hydroxyl groups, can be prepared by methods known per se. Particularly advantageous results are obtained in cases where these compounds contain 0.4 to 4.0 heterocyclic rings per 1000 molecular weight units. Five-membered imide rings, pyrrolidone rings and/or hydantoin rings have proved to be particularly effective heterocyclic ring systems for the purpose of the invention. These ring systems in the molecule of the compounds of component (*a*) provide the insulating coatings with a high level of resistance to both heat and chemicals.

The compounds of component (*a*) are generally condensation products or addition products of polyols with polycarboxylic acids and/or polyisocyanates and, optionally, polyamines. In the context of the invention, polyols, polycarboxylic acids, polyisocyanates and polyamines also include compounds of the kind containing both hydroxyl groups and also carboxyl, isocyanate and/or amine groups. Once again, it is preferred for the ratio $$K = n_1/(n_2(F_2 - 1))$$

in which $n_1$ is the molar number of the polyols and polyamines, $n_2$ the molar number of the polycarboxylic acids and/or polyisocyanates and $F_2$ the functionally of the polycarboxylic acids and/or polyisocyanates, to amount to between 1.0 and 2.0 and preferably to between 1.3 and 1.7.

One preferred group of compounds such as these is represented by the polyester imides known per se which, optionally, also contain amide bonds in the molecule but which according to the present invention must have the above-defined content of 5 to 12 percent by weight of hydroxyl groups. This hydroxyl group content is not normal according to the prior art. The compounds of component (*a*) can also contain urethane groups in the molecule. In other words, this means that the compounds of component (*a*) are prepared simply by reacting suitable compounds (compounds containing hydroxyl groups) with polyisocyanates and the compounds of component (*a*) thus obtained are mixed in the lacquer solutions with further polyisocyanates, after which the polyisocyanates present in the solution react with the residual hydroxyl groups of the compounds of component (*a*) on the wire, accompanied by crosslinking, during heating of the coated electrical conductors to elevated temperatures.

One particularly suitable group of compounds of component (*a*) containing hydantoin rings is represented by nitrogen-containing polycondensates of the kind described in published German Pat. application, Offenlegungsschrift No. 1,814,497, assigned to the assignee of the present application. The immediately foregoing compounds comprise condensation products of (A) polyfunctional alcohols, amines, and amino alcohols; polyisocyanates; polyisothiocyanates; or mixtures thereof and (B) aromatic ring containing polycarboxylic acids having a functionality of 2–4 (or their derivatives reactive with (A)) wherein at least 10 molar percent of (B) contains one or more carboxyl groups attached through a C-atom to an aromatically substituted imino group.

Any of those compounds which have already been used for the production of solderable wire lacquers in the prior art, can be used in accordance with the invention as the bifunctional or higher-functional isocyanates. Suitable isocyanates and thioisocyanates of this kind include for example tolylene diisocyanates, adducts of polyalcohols and tolylene diisocyanates, trimerized tolylene diisocyanates, 1,6-n-hexane diisocyanate, N,N-bis-(4-methyl-3-isocyanatophenyl)-urone, p,p'-diisocyanato diphenylmethane, isophorone diisocyanate and their derivatives prepared with phenol, acetoacetic ester etc. which reform the isocyanates at temperatures below 200° C.

The invention is illustrated in the following Examples. The testing methods referred to in these Examples were carried out as follows:

1. Winding strength under pre-elongation : a length of wire is pre-elongated to the percentage indicated and then wound around a mandrel whose diameter is equal to the diameter of the wire being tested. The insulated conductor is then examined for cracks in the lacquer layer. If no cracks are found, the tested wire is in order (*i.O.*). The degree of pre-elongation at which the wire is still in order is quoted. The testing conditions are described in detail in DIN 46 453, section 5.1.2, sheet 1.

2. Pencil hardness : a pencil sharpened in the form of a spatula is guided by hand at an angle of 60° over the elongated conductor. Tests with different pencil hardnesses are carried out. The "pencil hardness" indicated is that hardness of a pencil at which the lacquer is not damaged. The test conditions are described in detail in DIN 46 453, sheet 1, section 5.4.1.3.

3. Pencil hardness after 30 minutes in
   a. ethanol, or
   b. styrene at 60° C. The test is carried out in the same way as test No. 2 except that before the test is carried out the insulated electrical conductor was kept for 30 minutes in ethanol or styrene at a temperature of 60° C.

4. Dielectric strength in V/um: a piece of the electrical conductor is twisted with a second piece over a length of 125 mm, and the two lengths of conductor thus twisted are placed under a voltage which is continuously increased until short-circuiting occurs. The short-circuit voltage divided by the average layer thickness gives the dielectric strength. The test conditions are described in detail in DIN 46 453, sheet 1, section 5.3.1.

5. Break point for the function $tg = f(\phi)$ at 1 kcls measured in °C: the dependence of the dielectric loss factor tan $\phi$ upon temperature is determined on an insulated electrical conductor in the form of a capacitor, and the temperature at which the lacquer film on the conductor loses its insulating properties, characterized by the position of the point at which the tangent intersects both branches of the curve of the dependence found, expressed at the break point. The test conditions are described in detail in DIN 46 453, sheet 2, section 1.2.

6. Thermal shock for 30 minutes at 160°C. over once the diameter: the diameter is wound into a coil around a mandrel with the same diameter as the wire, kept in an oven for 30 minutes at 160°C and then assessed as in test No. 1. The test conditions are described in detail in DIN 46 453, sheet 1, section 5.2.1.

7. Thermal shock for 30 minutes at 180° C: this test is carried out in the same way as test No. 6 except that the oven is kept at 180° C.

8. Bosch thermal shock at 130° C with 5 percent pre-elongation: this test is carried out in the same way as test No. 6 except that the insulated electrical conductor is stretched by 5 percent.
9. Softening point in °C according to DIN 46 453, sheet 1, section 5.22: the softening point is that temperature at which the two wires placed crosswise one above the other under standard weights are short circuited after having been placed under voltage and subjected to an increase in temperature.
10. Soldering time in seconds: the insulated electrical conductor is immersed in a bath consisting of a tin/lead alloy (tin solder L Sn 60 Pb DIN 1707) heated to 370° C. The period of time it takes for the insulation to detach itself completely and for a uniform layer of tin to be formed upon the conductor, is measured. The test conditions are described in detail in DIN 46 453, sheet 1, section 5.4.2.

EXAMPLE 1

1.0 mol of a diimido dicarboxylic acid of 4,4'-diaminodiphenyl
methane and trimellitic acid anhydride
2.0 mols of dimethyl terephthalate
2.0 mols of ethylene glycol
1.9 mols of glycerine
The dimethyl terephthalate and the polyols were transesterified in the usual way at temperatures of from about 180° to 210° C in the presence of cresol as entraining agent, and the intermediate products formed esterified in the aforementioned ratio with the aforementioned diimido dicarboxylic acid at temperatures of from 200° to 220° C up to an acid number of less than 15.

The polyester formed was dissolved in commercial cresol to form a 50 percent solution. A stoichiometric quantity corresponding to the hydroxyl number of the polyester of a masked polyisocyanate of trimethylol propane, tolylene diisocyanate and phenol (Desmodur AP-Stabil, a product of Farbenfabriken Bayer AG, Leverkusen), was then added to this solution followed by catalysis.

The lacquer thus obtained was applied to conductors differing in diameter and then stoved or baked in the usual way in a radiation wire-lacquering oven.

The coated conductors were then tested, the results of the tests being set out in Table 1.

EXAMPLE 2

1.0 mol of a diimido dicarboxylic acid of 4,4'-diaminodiphenyl
methane and trimellitic acid anhydride
1.0 mol of dimethyl terephthalate
2.5 mols of ethylene glycol
0.5 mol of glycerine The polyester was prepared, dissolved, mixed and applied as described in Example 1.

EXAMPLE 3

1.0 mol of a diimidodicarboxylic acid of 4,4'-diaminodiphenyl
methane and trimellitic acid anhydride
3.0 mols of isophthalic acid
1.0 mol of tolylene diisocyanate
3.5 mols of glycerine
3.0 mols of ethylene glycol The isopthalic acid was esterified with the polyols as described in Example 1. The intermediate product was then reacted with the aforementioned diimido dicarboxylic acid, the polyester formed dissolved and the resulting solution cooled to around 80° C. The solution has a concentration of approximately 50 percent. The tolylene diisocyanaeis then added and the exothermic reaction left to take place. The mixture formed is then kept for 1 hour at 150° C, resulting in the formation of a solution of compounds of component (*a*) according to the present invention. The masked isocyanate is then added to this solution as in Example 1, and the resulting mixture used to coat electrical conductors.

EXAMPLE 4

2.0 mols of bis[4-carboxy-N-pyrrolidony-4-phenyl]-methyl prepared from 1 mol of diaminodiphenylmethane and 2 mols of itaconic acid
2.0 mols of glycerine
0.6 mol of diethylene glycol The aforementioned components were esterified and further processed by conventional techniques in accordance with Example 1.

EXAMPLE 5

1.0 mol of the reaction product of
2 mols of diaminodiphenylmethano-N,N'-diacetic acid ethyl ester and
1.0 mol of 4,4'-diisocyanato diphenylmethane
3.0 mols of dimethyl terephthalate
1.0 mol of glycerine
5.0 mols of ethylene glycol The aforementioned components were esterified and further processed by the usual techniques in accordance with Example 1.

The aforementioned compounds containing heterocyclic ring members can be used either as such or in the form of their components for the formation of the end products, in other words the reaction is carried out in the same reaction vessel as the reaction with the other compounds and the aforementioned reaction products are not isolated or separated off beforehand. The production of insulating solderable coatings on electrical conductors using the lacquer solutions prepared in accordance with the preceding Examples was carried out as follows:

A. In a radiation oven, oven temperature 390° C, Conductor diameter 0.8 mm, take-off rate 21 meters per min,
Stripping with felt
6 dips (coatings), total covering 50 to 60 mm
B. In a recirculating-air oven, oven temperature 330° –480° C
Conductor diameter 0.15 mm, take-off rate 60 meters per min.,
Metering pump to control the quantity applied
6 dips (coatings),
Stripping with felt,
Total covering 25 – 30 mm The following comparison tests were carried out in order to demonstrate the superiority of the process according to the invention to products obtained by conventional techniques:

COMPARISON TEST *A*

A 50 percent solution of a commercially available polyurethane (Desmophen L 2210, a product of Farbenfabriken Bayer AG, Leverkusen), which is recommended for the production of insulating solderable coatings, is mixed as described in Example 1 with the masked polyisocyanate mentioned in that Example in the ratios indicated, and similarly used for coating electrical conductors. The test results are also set out in Table 1.

COMPARISON TEST *B*

A commercial phthalic acid polyester (Desmophen 600 neu, a product of Farbenfabriken Bayer AG, Leverkusen), which is recommended for the production of insulated solderable coatings along the lines of the present invention, was further processed as described in Example 1 and comparison test 1. The test results are set out in Table 1.

COMPARISON TEST *C*

A commercially available adipic acid ester (Desmophen 800, a product of Farbenfabriken Bayer AG, Leverkusen) which is also recommended for the production of insulating solderable coatings on electrical conductors, was processed as in Example 1 and Comparison test *a*. The results are again set out in Table 1.

pound of component (*a*) contains hydantoin rings as the heterocyclic ring systems.

6. A process as claimed in claim 1, wherein the compound of component (*a*) is a condensation or addition product of a polyol with a polycarboxylic acid, polyisocyanate, polyamine, or a mixture thereof.

7. A process as claimed in claim 1, wherein the compound of component (*a*) is a polyester imide or a polyester imide containing amide bonds in the molecule.

8. A process as claimed in claim 1, wherein the compound of component (*a*) contains urethane groups in the molecule.

9. A process as claimed in claim 1, wherein the compound of component (*a*) is a condensation product of (A) polyfunctional alcohols, amines, and amino alcohols; polyisocyanates; polyisothiocyanates; or mixtures thereof and (B) aromatic ring containing polycarboxylic acids having a functionality of 2–4 wherein at least 10 molar percent of (B) contains one or more carboxyl groups attached through a C-atom to an aromatically substituted imino group.

10. A composition suitable for producing insulating solderable coatings on electrical conductors according to the process of claim 1, comprising a. a compound with at least two hydroxyl groups, and b. a masked polyfunctional isocyanate, wherein component (*a*) or (*b*) is partly trifunctional or more highly functional, and wherein the compound of component (*a*) contains heterocyclic ring systems in the molecule and from 5 to 12 percent by weight of hydroxyl groups.

TABLE 1

| | Example 1 | 2 | 3 | 4 | 5 | a | b | c |
|---|---|---|---|---|---|---|---|---|
| A (0.8): | | | | | | | | |
| 1. Winding strength, percent | 15–20 | 15 | 5–10 | 15 | 25 | a | b | c |
| 2. Hardness | 4H | 4H | 4H | 4H | 3H | 4H | 4H | 3H |
| 3. Spirit hardness | 4H | 4H | 4H | HB | 3H | 3B | 3B | 5–6B |
| 4. V./μm | 150 | 150 | 160 | 140 | 140 | 150 | 150 | 150 |
| 5. Tan δ-breakpoint, degrees | 170 | 167 | 167 | 142 | 135 | 142 | 145 | 115 |
| 6. Thermal shock 30′, 160° C | i.O | i.O | i.O | i.O | i.O | n.i.O | n.i.O | n.i.O |
| 7. Thermal shock 30′, 180° C | i.O | i.O | n.i.O | n.i.O | n.i.O | n.i.O | n.i.O | n.i.O |
| 8. Bosch TS | i.O | i.O | i.O | i.O | i.O | i.O | i.O | n.i.O |
| 9. Softening point, ° C | 246 | 236 | 240 | 231 | ........ | 242 | 230 | 210 |
| 10. Soldering time, seconds | 3.5–4.0 | 2.5–3 | 2.5 | 4.5 | 4 | 3–4 | 4–5 | 4–5 |
| B (0.15): | | | | | | | | |
| 5. Tanδ-bending point, ° C | 159 | 155 | 149 | 130 | ........ | 130 | 130 | 105 |
| 10. Soldering time | 0.40 | 0.35 | 0.40 | 0.50 | ........ | 0.70 | 0.7–1.0 | 1.0 |

NOTE.—i.O = in order; n.i.O = not in order.

We claim:

1. A process for the production of insulating solderable coatings on electrical conductors, comprising coating an electrical conductor with a solution containing:

a. a compound with at least two hydroxyl groups, and b. a masked polyfunctional isocyanate wherein one of components (*a*) or (*b*) is partly trifunctional or more highly functional and wherein component (*a*) is a compound containing heterocyclic ring systems in the molecule and 5 to 12 percent by weight of hydroxyl groups, and thence heating the conductor thus coated at a temperature above about 250° C.

2. A process as claimed in claim 1, wherein the compound of component (*a*) contains 0.4 to 4.0 heterocyclic rings per 1,000 molecular weight units.

3. A process as claimed in claim 1, wherein the compound of component (*a*) contains 5-membered imide rings as the heterocyclic ring systems.

4. A process as claimed in claim 1, wherein the compound of (*a*) contains pyrrolidone rings as the heterocyclic ring systems.

5. A process as claimed in claim 1, wherein the compound of component (*a*) contains hydantoin rings as the heterocyclic ring systems.

11. A composition as claimed in claim 9, wherein the compound of component (*a*) contains 0.4 to 4.0 heterocyclic rings per 1,000 molecular weight units.

12. A composition as claimed in claim 9, wherein the compound of component (*a*) contains five-membered imide rings as the heterocyclic ring systems.

13. A composition as claimed in claim 9, wherein the compound of component (*a*) contains pyrrolidone rings as the heterocyclic ring systems.

14. A composition as claimed in claim 9, wherein the compound of component (*a*) contains hydantoin rings as the heterocyclic ring systems.

15. A composition as claimed in claim 9, wherein the compound of component (*a*) is a condensation product or addition product of a polyol with a polycarboxylic acid, polyisocyanate, polyamine, or a mixture thereof.

16. A composition as claimed in claim 9, wherein the compound of component (*a*) is a polyester imide or a polyester imide containing amide bonds in the molecule.

17. A composition as claimed in claim 9, wherein the compound of component (*a*) contains urethane groups in the molecule.

18. A composition as claimed in claim 9, wherein the compound of component (*a*) is a condensation product of (A) polyfunctional alcohols, amines, and amino alcohols; polyisocyanates; polyisothiocyanates; or mixtures thereof and (B) aromatic ring containing polycarboxylic acids having a functionality of 2–4 wherein at least 10 molar percent of (B) contains one or more carboxyl groups attached through a C-atom to an aromatically substituted imino group.

19. An electrical conductor having an insulation solderable coating comprised of a cured coating of the composition claimed in claim 9.

* * * * *